Feb. 9, 1926.  1,572,854

E. CLARK ET AL

PAVING BLOCK AND THE LIKE

Filed Feb. 7, 1924

INVENTORS
Ernest Clark
Daniel T. Siemon Jr.
by Brown Seward
ATTORNEYS

Patented Feb. 9, 1926.

1,572,854

UNITED STATES PATENT OFFICE.

ERNEST CLARK, OF RIO DE JANEIRO, BRAZIL, AND DANIEL T. GILMARTIN, JR., OF EAST ORANGE, NEW JERSEY.

PAVING BLOCK AND THE LIKE.

Application filed February 7, 1924. Serial No. 691,161.

*To all whom it may concern:*

Be it known that we, ERNEST CLARK, a citizen of the Commonwealth of Australia, and DANIEL T. GILMARTIN, Jr., a citizen of the United States, and residents of Rio de Janeiro, Brazil, and East Orange, in the county of Essex and State of New Jersey, respectively, have invented a new and useful Improvement in Paving Blocks and the like, of which the following is a specification.

This invention relates to an improvement in paving or flooring, and has for an object to provide a block, brick, slab, layer, or the like, which embodies, among other features of value, the qualities of resilience, silence, durability and anti-slipping.

Broadly considered, the invention comprehends the intimate combination of a layer of rubber and a layer of plastic material such, for instance, as concrete. When, in this patent, we use the word "rubber", we intend to include any practical compound of rubber and, more particularly, a vulcanized rubber compound. When we refer to a "plastic" layer or element, we intend to include any plastic substance suitable for the purpose and, more particularly, a cementitious substance.

A more definite characterization of the invention resides in the fact that it contemplates the direct application of the rubber layer or element to the plastic layer or element; and this latter may either consist of an individual layer or element so as to be combined with the rubber portion to form an individual or independent brick, or the like; or it may consist of a plastic layer of considerable extent such, for instance, as a road bed or floor bed, upon which a plurality of rubber layers or elements may be set.

The direct application of the rubber element to the plastic element constitutes an important feature of our invention, since it promotes simplicity and economy, and because the parts may readily be united either by setting a previously formed vulcanized rubber element into the plastic element while the latter is in plastic condition, or by combining the rubber element, while in plastic condition, with a previously formed and hardened plastic element; or, under certain circumstances, in combining the two elements while they are both in a more or less plastic condition.

In order to promote a firm union between the elements or parts, we provide one or both of the parts with projections or depressions so that the parts will effectually interlock with each other. By preference, these projections are formed on the rubber part or element, and consist of studs or ribs having enlarged heads or surfaces.

A practical embodiment of the invention is represented in the accompanying drawings, in which—

Figure 1:
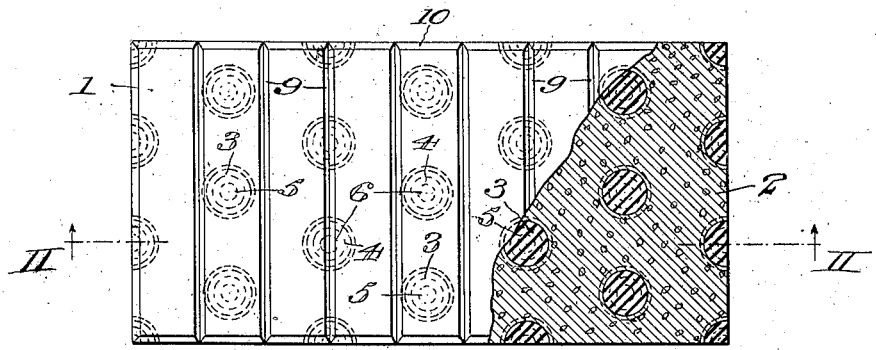
Fig. 1 represents a top plan view, partly broken away, showing the preferred form of our invention.
Figure 2:
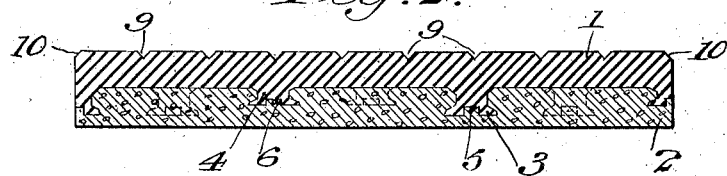
Fig. 2 represents a section taken in the plane of the line II—II of Fig. 1, looking in the direction of the arrows.

Referring to the form shown in Figs. 1 and 2, the rubber layer or element is denoted by 1, and may consist of any well known or approved rubber compound suitably molded to shape and vulcanized. The plastic or cementitious layer is marked 2 and may consist of any suitable material such, for instance, as concrete.

The rubber element 1 has a series of studs 3, 4 projecting from the lower surface thereof, and it will be observed that the studs of the series 3 are somewhat higher than those of the series 4. This is a feature of some value because it arranges the studs in a staggered relationship when they are embedded in the plastic element and thereby prevents the formation of a line or plane of weakness in the plastic element, which might be occasioned if the height of all studs were the same, and which line or plane of weakness might have a tendency to promote cleavage under strain.

The heads or outer surfaces of the studs are enlarged, as clearly shown in Fig. 2, in order to insure a stronger union or interlocking between the rubber element and the plastic element. The said heads also have depressions 5, 6 which increase the interlocking effect, but are more particularly designed to assist in the withdrawal of the rubber element 1 from its metallic mold in which it is vulcanized. The presence of these depressions 5, 6 permits the laterally projecting or enlarged heads of the studs to readily be compressed or reduced in diameter by the manual act of pulling the rubber element out of its metallic mold.

In manufacturing the brick or block, we prefer to compound, mold and vulcanize the rubber element into finished form, all in a manner well understood to those familiar with the rubber industry, and then to set it into the plastic or cementitious element while the latter is in a soft or plastic condition. The plastic element is then permitted to harden, under any well known or approved conditions, and the brick or block is complete.

If desired, the plastic or cementitious element may be molded and permitted to harden in its own form, and, thereafter, the rubber element, while in compounded but plastic condition, be associated with the plastic element and vulcanized in this position.

Figure 3:
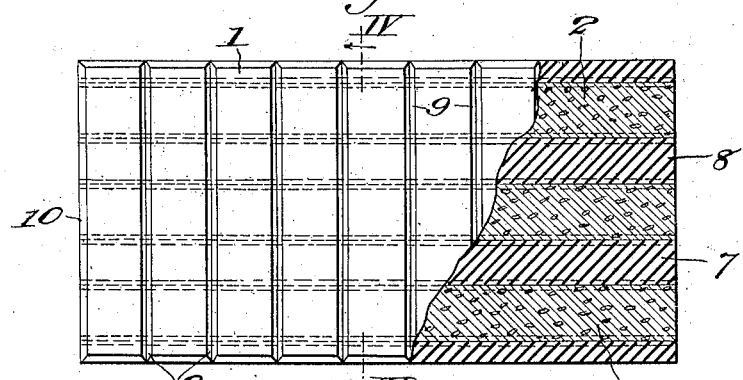
Fig. 3 represents a view similar to Fig. 1, showing a modified form of the invention.
Figure 4:
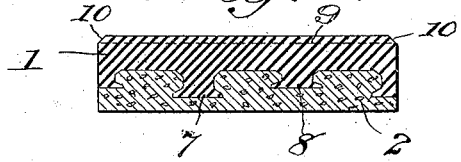
Fig. 4 represents a section taken in the plane of the line IV—IV of Fig. 3, looking in the direction of the arrows.

Referring to the modified form shown in Figs. 3 and 4, the parts are formed and combined in the same manner, except that, instead of employing the studs 3, 4, we use ribs 7, 8. It is not necessary to provide the said ribs with external grooves to assist in the removal from the mold in which the rubber element is vulcanized, because the said element may be slid, in a direction lengthwise of the ribs, for the purpose of separating it from its mold.

Having in mind both forms shown in the drawings, it may be said that, under certain circumstances, it may be desirable to provide cross grooves or scorings 9 in the upper surface of the rubber element in order to increase the anti-slipping characteristic of the block or brick. To this end also, the upper peripheral edges of the rubber element may be beveled, as indicated at 10, either with or without the presence of the grooves 9. These bevels on each block or brick, when combined with adjacent bevels, will form grooves intermediate the bricks and of themselves constitute an anti-slipping feature.

In use, when the blocks are formed with individual plastic or cementitious elements, they may be set upon a suitable foundation just as any other paving block, and this foundation may, itself, if desired, consist of cementitious material such as concrete or the like. If it is desired to dispense with the individual plastic or cementitious elements, the rubber elements may be, by themselves, set into an extended base or foundation of plastic or cementitious material, thereby, in effect, obtaining the same result.

We desire it to be understood that various changes may be resorted to in the form, construction, composition and arrangement of the several parts without departing from the spirit and scope of our invention, and hence, we do not intend to be limited to the details herein shown and described, except as the same are included in the claims.

What we claim is:

1. An article of the character described comprising, a rubber element and a plastic element united by direct contact between the two, one of said elements having projections extending into the other, a plurality of said projections being spaced from the edges of the element to which they belong, and the binding contact between the two said elements being established by the direct contact of the said elements and the direct engagement of the projections on the one element with the other element.

2. An article of the character described comprising, a rubber element and a plastic element united by direct contact between the two, one of said elements having projections extending into the other, said projections having enlarged outer portions, a plurality of said projections being spaced from the edges of the element to which they belong, and the binding contact between the two said elements being established by the direct contact of the said elements and the direct engagement of the projections on the one element with the other element.

3. An article of the character described comprising, a rubber element and a plastic element united by direct contact between the two, one of said elements having projections extending into the other, said projections varying in height.

4. An article of the character described comprising, a rubber element and a plastic element united by direct contact between the two, said rubber element having projections extending into the plastic element, said projections varying in height.

5. An article of the character described comprising, a rubber element and a plastic element united by direct contact between the two, one of said elements having projections extending into the other, said projections having enlarged outer portions and varying in height.

6. An article of the character described comprising, a rubber element and a plastic element united by direct contact between the two, said rubber element having projections extending into the plastic element, said projections having enlarged outer portions and varying in height.

7. An article of the character described comprising, a rubber element and a plastic element united by direct contact between the two, said rubber element having beveled upper edges, a plurality of said projections being spaced from the edges of the element to which they belong, and the binding contact between the two said elements being established by the direct contact of the said elements and the direct engagement of the projections on the one element with the other element.

8. An article of the character described comprising, a rubber element and a plastic element united by direct contact between the two, one of said elements having studs extending into the other, a plurality of said studs being spaced from the edges of the element to which they belong, and the binding contact between the two said elements being established by the direct contact of the said elements and the direct engagement of the studs on the one element with the other element.

9. An article of the character described comprising, a rubber element and a plastic element united by direct contact between the two, one of said elements having studs extending into the other, said studs having enlarged outer portions, a plurality of said studs being spaced from the edges of the element to which they belong, and the binding contact between the two said elements being established by the direct contact of the said elements and the direct engagement of the studs on the one element with the other element.

In testimony, that we claim the foregoing as our invention, we have signed our names this 6th day of February, 1924.

ERNEST CLARK.
DANIEL T. GILMARTIN, Jr.